US006859267B2

(12) United States Patent
Dam-Hansen et al.

(10) Patent No.: US 6,859,267 B2
(45) Date of Patent: Feb. 22, 2005

(54) LASER DOPPLER ANEMOMETRY WITH DIFFRACTIVE OPTICAL ELEMENTS

(75) Inventors: Carsten Dam-Hansen, Taastrup (DK); Steven Richard Kitchen, Roskilde (DK); Michael Linde Jakobsen, Frederiksberg (DK)

(73) Assignee: Kamstrup A/S, Skanderborg (DK)

( * ) Notice: Subject to any disclaimer, the term of this patent is extended or adjusted under 35 U.S.C. 154(b) by 0 days.

(21) Appl. No.: 10/611,987

(22) Filed: Jul. 3, 2003

(65) Prior Publication Data

US 2004/0036873 A1 Feb. 26, 2004

Related U.S. Application Data

(60) Provisional application No. 60/393,585, filed on Jul. 5, 2002.

(51) Int. Cl.[7] .................... G01P 3/36; G01N 15/02; G01B 9/02

(52) U.S. Cl. ................ 356/28.5; 356/336; 356/484

(58) Field of Search ............... 356/28, 28.5, 336, 356/484–488

(56) References Cited

U.S. PATENT DOCUMENTS

| 4,397,550 A | * | 8/1983 | Matsuda et al. ........... 356/28.5 |
| 4,948,257 A | | 8/1990 | Kaufman et al. |
| 5,179,418 A | * | 1/1993 | Takamiya et al. .......... 356/28.5 |
| 5,272,512 A | * | 12/1993 | Kadowaki et al. ............ 356/28 |

(List continued on next page.)

FOREIGN PATENT DOCUMENTS

| WO | WO 00/19212 | 4/2000 |
| WO | WO 01/38884 A1 | 5/2001 |

OTHER PUBLICATIONS

Rothberg et al., "Developments in laser Doppler accelerometry (LDAc) and comparison with laser Doppler velocimetry", Optic and Lasers in Engineering 32 (2000) 549–564.

Czarske et al., "Application of diffraction gratings in the laser Doppler anemometry", Hannover University, Germany, DE + GB Abstract 1994.

Schmidt et al., "Holographic optical coupling and beam-splitting elements for optoelectronic interconnects and sensors" 1998 Elsevier Engineering Information, Inc. DE(mangler) + abstract.

Schmidt et al., "Diffractive beam splitter for laser Doppler velocimetry" 1992 Optical Society of America, vol. 17, No. 17.

Search Report.

*Primary Examiner*—Mark Hellner
*Assistant Examiner*—Brian Andrea
(74) *Attorney, Agent, or Firm*—Harness, Dickey & Pierce, PLC (57) ABSTRACT

The present invention relates to an apparatus for use in the determination of a condition or state of an object based on quasi-elastic interaction between the object and light transmitted to the object, the apparatus comprising a beam splitter arrangement for splitting an incoming light beam of wavelength, $\lambda$, into a diffracted light beam and an undiffracted light beam, the beam splitter arrangement comprising a first and a second diffractive member, the first diffractive member transforming the light beam emitted by the light source into the diffracted and the undiffracted light beams, the second diffractive member receiving the diffracted light beam and diffracting the received light beam in a direction substantially parallel to the undiffracted light beam from the first diffractive member, wherein the diffracted light beam, after being diffracted by the second diffractive member, and the undiffracted light beam from the first diffractive member are separated by a distance, d, said distance, d, being dependent on wavelength, $\lambda$.

29 Claims, 6 Drawing Sheets

U.S. PATENT DOCUMENTS

| | | |
|---|---|---|
| 5,327,222 A | 7/1994 | Makoto et al. |
| 5,502,466 A * | 3/1996 | Kato et al. .................. 356/499 |
| 5,552,879 A * | 9/1996 | Takamiya et al. .......... 356/28.5 |
| 5,751,830 A * | 5/1998 | Hutchinson .................. 382/103 |
| 5,926,276 A * | 7/1999 | Takamiya et al. ........... 356/494 |
| 5,999,256 A * | 12/1999 | Jones et al. ................. 356/335 |

* cited by examiner

PRIOR ART

LASER DOPPLER ANEMOMETRY WITH DIFFRACTIVE OPTICAL ELEMENTS

This application claims benefit of provisional application No. 60/393,585 filed on Jul. 5, 2002.

FIELD OF THE INVENTION

The present invention relates to a Laser Doppler Anemometry (LDA) system, which assures that the fringe spacing in a measurement volume is independent of wavelength changes, whereby non-stabilised laser diodes may be applied as light sources.

BACKGROUND OF THE INVENTION

The most widely used optical technique for measurement of velocity of fluid flow or solid objects known in the art is the laser Doppler technique. According to this technique, two laser beams from the same laser are set to intersect at their beam waists. This region is referred to as the measurement volume. Scattered light from particles passing this region is imaged onto a photo detector. Since the light scattered from both beams reaches the detector simultaneously, a beat frequency, corresponding to the difference in Doppler shifts from the two scattered beams, is obtained. The beat frequency is directly proportional to the velocity component perpendicular to the fringe geometry, which emerges in the cross section. The velocity is determined by Fourier transformation and/or counting zero crossings of the high-pass filtered detector signal. The principle is often referred to as LDA, when used for measuring velocities of gases, or Laser Doppler Velocimetry (LDV), when used for measuring velocities of fluids or solid objects.

Figure 1:
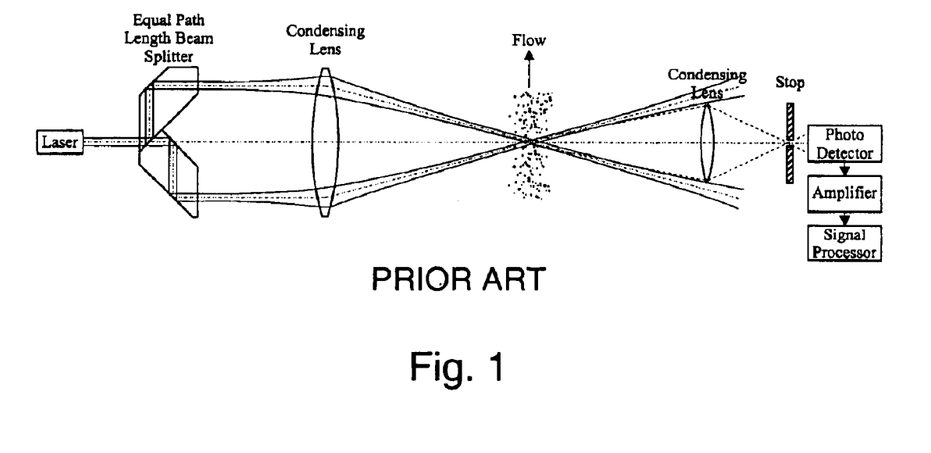
FIG. 1 shows a conventional set-up (prior art) for LDA systems.

The most common configuration of the LDA system is the differential LDA system—see FIG. 1. A laser beam is split into two beams of equal intensity by a 50/50 equal path length beam splitter and later both beams are focused and crossed at the point under investigation by a condensing lens. Scattered light from particles passing through this region is focused and sent to a photo detector. Since the light scattered from both beams reaches the detector simultaneously, a beat frequency, corresponding to the difference in Doppler shifts from the two scattered beams, is obtained. The beat frequency is directly proportional to the velocity component perpendicular to the fringe geometry, which emerges in the cross section.

LDA has found many applications, especially in the studies of fluid dynamics, where the light does not obstruct the flow. Furthermore, the spatial resolution of LDA systems is high. Nothing other than light has to be sent to the point of interest (measurement volume) and the light beams can be focused to a very small measurement volume.

Traditionally, light sources in LDA systems are gas lasers e.g. a Helium-Neon laser or an Argon-ion laser. The use of such bulky laser systems makes conventional LDA systems rather bulky and expensive in terms of manufacturing.

One of the steps in making LDA systems compact and cheap is to use semiconductor devices as the light source—for instance a laser diode. However, the emission wavelength of laser diodes is significant temperature dependent and even temperature stabilised laser diodes will be undefined within 1–3 longitudinal modes due to mode hops and hysteresis in the temperature dependence.

Consequently, the fringe spacing $\Lambda$ in the measurement volume will vary due to a linear dependency on the wavelength, $$\Lambda = \frac{\lambda}{2\sin(\theta/2)}$$

where $\lambda$ is the wavelength and $\theta$ is the angle between the probe beams. Since the measured frequency and thereby also the estimated velocity is directly proportional to the fringe spacing, the measured frequency for a given velocity will vary with the wavelength and will thus yield uncertainties in the estimation of the velocity.

From U.S. Pat. No. 4,948,257 a laser optical measuring device according to the laser Doppler principle is known. A method for stabilizing the fringe pattern in the measurement volume is described. Variations in the fringe spacing due to wavelength changes are compensated for by changing the closing angle of deflected beams.

A disadvantage of the system of U.S. Pat. No. 4,948,257 is that the closing angle of the beams in the measurement volume must be equal to the closing angle of the grating used as the beamsplitter. This results in strong limitations on the obtainable fringe spacing in the measurement volume and the physical dimension of the optical system cannot be less than the working distance (distance from last optical element to the measurement volume). In an embodiment, this problem is partly solved by introducing at least three specially designed prisms. However, the additional prisms increases the complexity and cost of manufacturing of the system of U.S. Pat. No. 4,948,257.

Furthermore, in one of the embodiments the position of the measurement volume will strongly depend on the wavelength which is undesirable. In addition, no optical receiver system for collecting the scattered light has been devised and the optimal back-scatter receiver will be difficult to implement.

From PCT No. WO 00/19212 a miniature laser Doppler probe is known. The fringe pattern in the measurement volume is formed through imaging of a diffraction grating which makes it substantially independent of wavelength. The imaging system consists of a single focusing lens. Only at a single position of this lens an image will be generated, where the beam waists are coincident with the image plane. This is needed in a laser Doppler system in order to obtain parallel fringes in the measurement volume.

Thus, in the system of WO 00/19212 the grating and lens set a strong limitation of the obtainable fringe period in the measurement volume. In order to obtain a better system a clean imaging system, consisting of at least two lenses, placed with a distance equal to the sum of the focal lengths is required. Such modification will add to the complexity and cost of the system suggested in WO 00/19212.

From J. Schmidt et al, "Diffractive beamsplitter for laser Doppler velocimetry", Opt. Letts. 17, 1240–1242, (1992), a diffractive beamsplitter arrangement for use in LDV is known. Here, the achromatic behaviour of diffractive gratings is used to make the fringe period in the measurement volume independent of the wavelength. In order to obtain high overall efficiency in the system (75%), the diffraction gratings are implemented as multiplexed volume holograms in dichromated gelatine. It is not possible to replicate such multiplexed volume holograms in a large scale low cost production.

The use of surface relief gratings would make replication of the diffraction gratings easy through e.g. injection moulding in polymer materials. However, using such surface relief gratings in the LDV suggested by J. Schmidts et al. would make the overall system efficiency much lower than the 75% obtained using volume holograms. This is due to the fact that is not possible to realise high diffraction efficiencies of surface relief gratings with the small diffraction angles and grating frequencies used here.

It is an object of the present invention to provide a flexible and simple beamsplitter arrangement that solves the above mentioned problems and is suitable for being used in highly efficient and low cost LDA systems.

SUMMARY OF THE INVENTION

The above-mentioned object is complied with by providing, in a first aspect, an apparatus for use in the determination of a condition or state of an object based on quasi-elastic interaction between the object and light transmitted to the object, comprising:

a beam splitter arrangement for splitting an incoming light beam of wavelength, $\lambda$, into a diffracted light beam and an undiffracted light beam, the beam splitter arrangement comprising a first and a second diffractive member, the first diffractive member transforming the light beam emitted by the light source into the diffracted and the undiffracted light beams, the second diffractive member receiving the diffracted light beam and diffracting the received light beam in a direction substantially parallel to the undiffracted light beam from the first diffractive member, wherein the diffracted light beam, after being diffracted by the second diffractive member, and the undiffracted light beam from the first diffractive member are separated by a distance, d, said distance, d, being dependent on wavelength, $\lambda$.

Preferably, distance, d, is substantially linear dependent on wavelength, $\lambda$.

The first and second diffractive members may be diffraction gratings having substantially identical grating constants. In a preferred embodiment, the diffraction gratings are implemented as surface relief gratings. Such surface relief gratings may be manufactured in a large scale and low cost production facility using techniques such as injection moulding.

The diffraction gratings in combination may diffract the incoming light beam in such a way that approximately 50% of the intensity of the incoming light beam is contained in the undiffracted light beam from the first diffractive member, and that approximately 50% of the intensity of the incoming light beam is contained in the light beam diffracted from the second diffractive member. In this way maximum efficiency is obtained.

The apparatus may further comprise a set of reflective members, said set of reflective members being inserted in the undiffracted beam of the first diffractive member and producing a redirected beam substantially parallel to the diffracted beam of the second diffractive member and thereby altering the distance, d. The set of reflective members may be formed by two reflective members, such as two reflective mirrors. Alternatively, the set of reflective members is formed by two diffractive reflective members, such as two reflective linear gratings.

In an alternative embodiment, the apparatus may further comprise a set of diffractive transmission members, said set of diffractive transmission members being inserted in the undiffracted beam of the first diffractive member and producing a redirected beam substantially parallel to the diffracted beam of the second diffractive member and thereby altering the distance, d. In this alternative embodiment, the set of diffractive transmission members may be formed by two transmission gratings having substantially identical grating constants, such as transmission surface relief gratings.

The apparatus according to the present invention may form part of a system adapted to measure the rotational speed of an object—this could for example be the rotational speed of a motor axis. For this purpose, the apparatus further comprises a detector, the detector being adapted to, via first and second diffractive members, detect light that has interacted with the object, the detection being performed in such a way that light from at least two measurement points on a surface of the object interfere on the detector, whereby the rotational speed of the object may be determined. In this way, the determination of the rotational speed becomes essentially independent of wavelength, $\lambda$.

The apparatus according to the present invention may also form part of a system adapted to measure the tilt of an object. For this purpose, the apparatus further comprises a detector, the detector being adapted to, via first and second diffractive members, detect light that has interacted with the object, the detection being performed in such a way that light from at least two measurement points on a surface of the object interfere on the detector, whereby a tilting of the object may be determined. In this way, the determination of the tilting of the object becomes essentially independent of wavelength, $\lambda$.

In case the apparatus according to the present invention does not form part of a rotation- or tilt-sensor, the apparatus may further comprise a refractive member inserted in the propagation paths of the diffracted and undiffracted light beams, said refractive member being adapted to change the propagation directions of the diffracted and undiffracted light beams so that the beams, in an intersection region, form a measurement volume having a fringe spacing being substantially independent of wavelength, $\lambda$, the measurement volume being substantially fixed in space.

The refractive member may be a focusing lens, where the intersection region falls within the beam-waist of the two beams. The apparatus may further comprise a receiver for receiving light that has interacted with the object. Preferably, the refractive member forms part of the receiver so as to establish a back-scattering configuration, where light that has interacted with the object is collected by the refractive member.

The apparatus may further comprise a processor operatively connected to the receiver for determining the condition or state of the object based on the detected light.

In order to generate the incoming light beam, the apparatus may further comprise a light source. Furthermore, the apparatus may comprise means for collimating the emitted light beam.

In principle, the light source may emit light between 400 and 10600 nm. Preferably, the light source is a substantially monochromatic light source, such as a gas laser, a solid state laser or a laser diode. Applicable wavelengths for usable laser diodes are e.g. 635, 660–680, 780, 800, 830 nm.

In a second embodiment, the present invention relates to a flow sensor for measuring flow velocity of a fluid, such as in a gas or a liquid. Preferably, the flow sensor comprises an apparatus according to the first aspect of the present invention.

In a third embodiment, the present invention relates to a velocity sensor for measuring the surface velocity of an object. Preferably, the velocity sensor comprises an apparatus according to the first aspect of the present invention.

In a fourth aspect, the present invention relates to a method for the determination of a condition or state of an object based on quasi-elastic interaction between the object and light transmitted to the object, the method comprising the steps of:

providing a beam splitter arrangement for splitting an incoming light beam of wavelength, λ, into a diffracted light beam and an undiffracted light beam, the beam splitter arrangement comprising a first and a second diffractive member, the first diffractive member transforming the light beam emitted by the light source into the diffracted and the undiffracted light beams, the second diffractive member receiving the diffracted light beam and diffracting the received light beam in a direction substantially parallel to the undiffracted light beam from the first diffractive member, wherein the diffracted light beam, after being diffracted by the second diffractive member, and the undiffracted light beam from the first diffractive member are separated by a distance, d, said distance, d, being dependent on wavelength, λ.

BRIEF DESCRIPTION OF THE DRAWINGS

The present invention will now be explained in further details with reference to the accompanying figures, where.

DETAILED DESCRIPTION OF THE INVENTION

Figure 2:
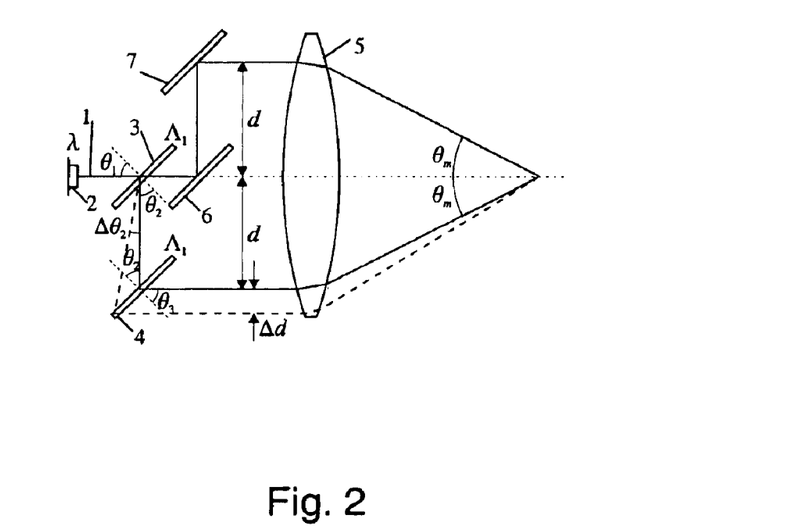
FIG. 2 shows a LDA system according to the present invention based on diffractive optical elements.

The LDA system according to the present invention is schematically illustrated in FIG. 2. A collimated laser beam 1, originating from a laser diode 2 with a collimation lens is incident on a linear grating 3 at an angle of 45 degrees to the normal. The grating both diffracts and transmits the light. The diffracted light is sent to another grating 4 with the same period. Thereby the light diffracted from the second grating 4 will be co-parallel with the transmitted light from the first grating 3. The light from these two "arms" is then sent to a condensing lens 5, which focuses and crosses the two laser beams at their beam waists. The result is that a fringe pattern arises in the section where the two beams are overlapping. The transmitted light from the first grating 3 is reflected in two mirrors 6,7 in order to assure an equal path length in the two arms.

The gratings are implemented as transmission surface relief gratings in photoresist. They are produced using an analog interferometric writing setup, employing a HeCd-laser at 441.6 nm.

The compensation of the fringe spacing occurs since the diffraction angle of the gratings is approximately proportional to the wavelength. That is, the diffraction angle will increase if the wavelength increases. Thereby the distance between the parallel beams will increase and consequently also the angle θ between the probe beams. With that the fringe spacing will decrease and compensate for the increase in wavelength according to the equation above.

Figure 3:
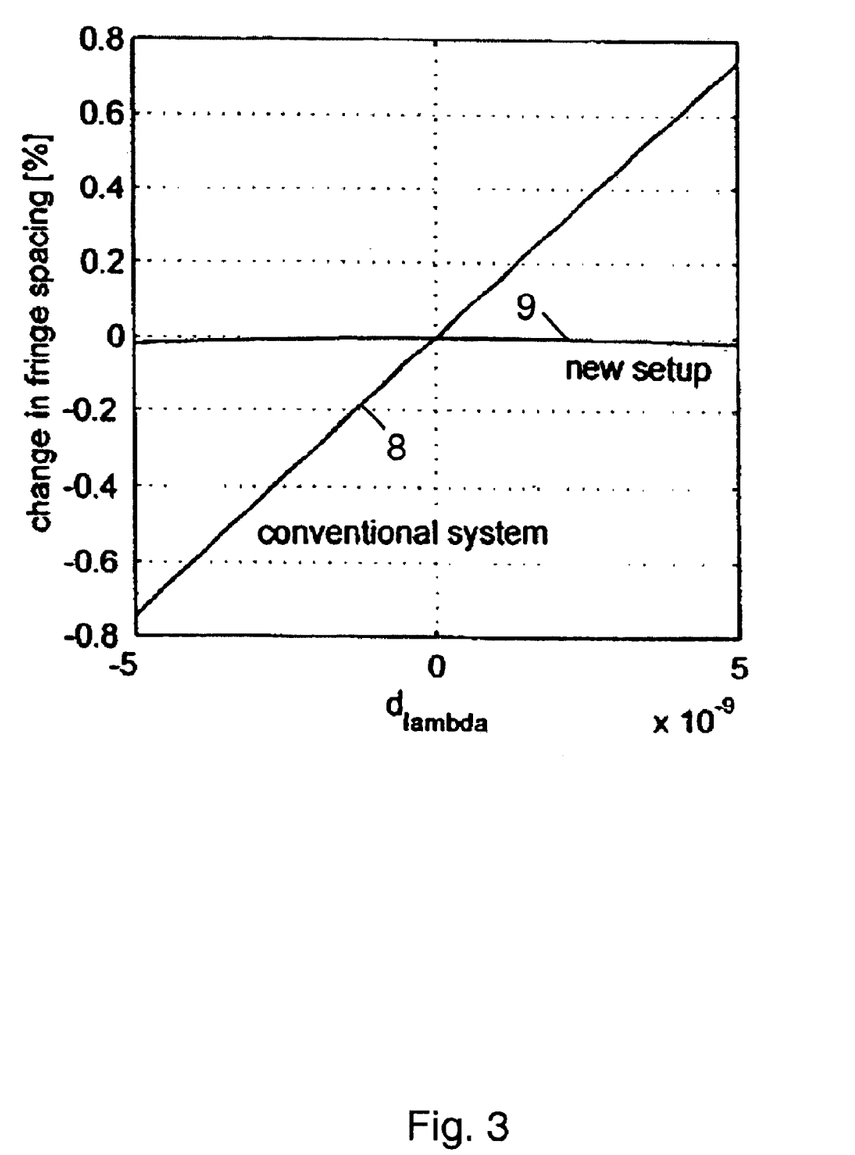
FIG. 3 shows a comparison between the fringe spacing as a function of the wavelength of a conventional LDA system and a LDA system according to the present invention.

The effect of the compensation can be seen from FIG. 3, which depicts the fringe spacing as a function of the wavelength change for both a conventional 8 and the proposed system (new setup) 9. The fringe spacing for the conventional system is seen to follow a linear curve, while the curve for the proposed system is parabolic. The slope for the new system is approximately a factor 100 smaller than that of the conventional system.

Figure 4:
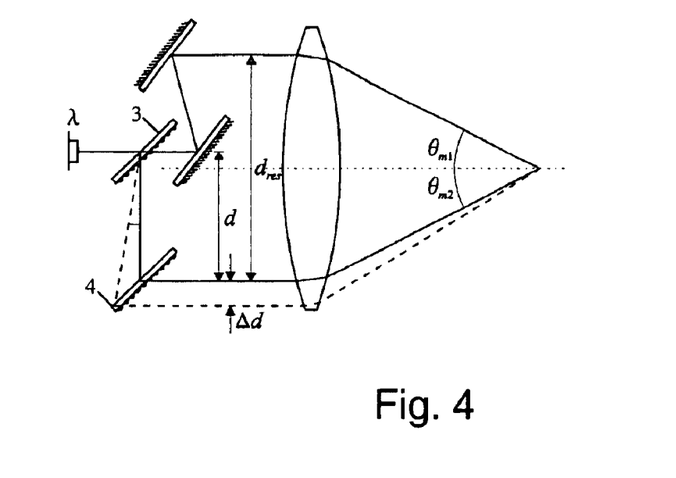
FIG. 4 shows a general set-up of the LDA system according to the present invention, where the gratings assure an optimum compensation for wavelength changes and the mirrors assure equal path lengths in the two arms.

Generally, the distance between the two gratings 3,4 can be varied to achieve the optimum compensation for the wavelength fluctuations, while the angles of the mirrors can be changed to assure an equal optical path length for the two arms, as illustrated in FIG. 4.

Figure 5:
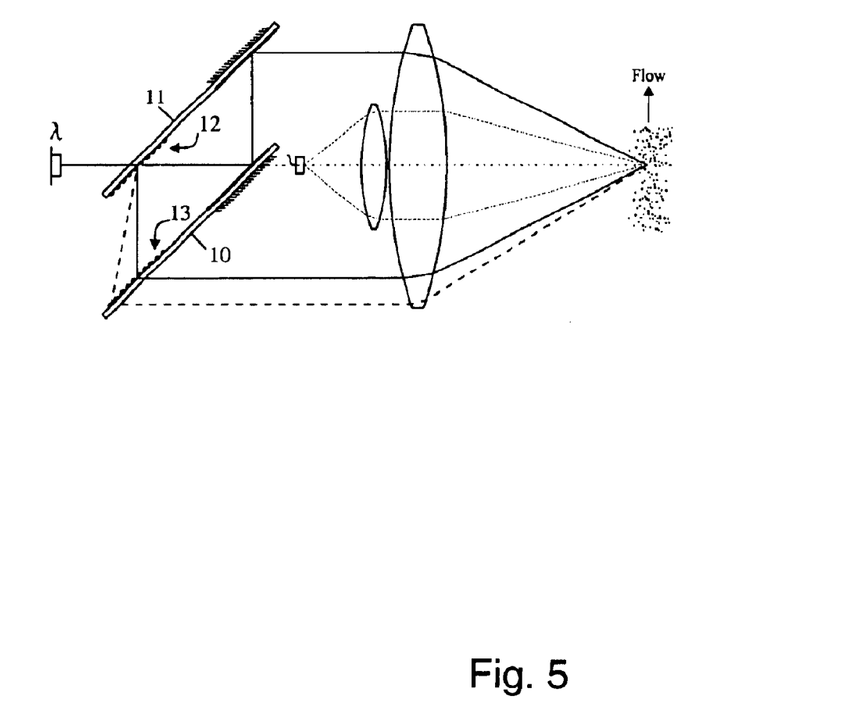
FIG. 5 shows a LDA system according to the present invention where the gratings and mirrors are placed on the same substrate and a second lens is inserted to focus the back-scattered light onto a detector.

A possible way of configuring the system is shown in FIG. 5. Here the optical components have been implemented in two blocks 10,11 and the collection of light is in a back-scattering mode. This provides a rigid, self-aligning and compact system. Compared to U.S. Pat. No. 4,948,257, where a back-scattering configuration is not possible, this provides an advantage. Additionally, the diffraction efficiency of the surface relief gratings 12,13 used here can be designed such that virtually no light is lost. The system is thus more energy efficient. Furthermore, the surface relief gratings 12,13 can be replicated, providing a possibility for mass-producing the sensor at low cost, which is not possible for the volume gratings used in J. Schmidt et al.

Figure 6:
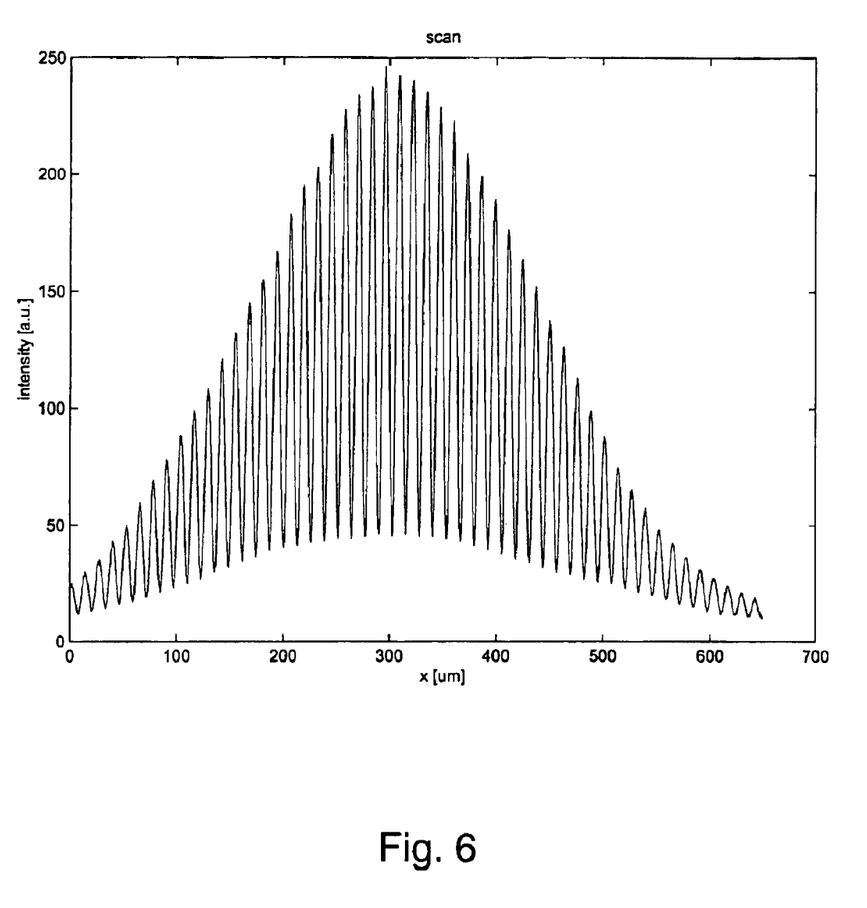
FIG. 6 shows a beam scan of the centre of the measurement volume.

Measurements for verifying the wavelength independent LDA system were performed with a tuneable external cavity laser diode having a centre wavelength of 672 nm—see FIG. 6. The collimated laser light was sent through the novel beam splitter consisting of two linear gratings with a grating period of approximately 475 nm and two mirrors. The mirrors are positioned in the path of the undiffracted light beam, thereby making the optical path length in the two arms equal and obtaining the distance, d, for optimum compensation of wavelength fluctuations. The depth of the grating structure sets the diffraction efficiency of the grating, and the applied grating period ensures that only two diffraction orders are present, the $0^{th}$ order (undiffracted) and the $1^{st}$ order (diffracted). The ratio of light in the $0^{th}$ and the $1^{st}$ diffraction order is 44/56 for the first grating and 10/90 for the second grating. These values ensures approximately equal intensities in the two parallel beams.

The distance, d, was set to 38 mm and the focusing lens had a focal length of 400 mm. Thereby a fringe period of approximately 7.08 um was obtained. The wavelength of the tuneable laser diode was changed in steps of 1 nm from 665 to 679 nm. For each wavelength, 10 scans of the measurement volume were made such as the one shown below. The scans were made with a beam scanner positioned in the cross section of the two laser beams.

Figure 7:
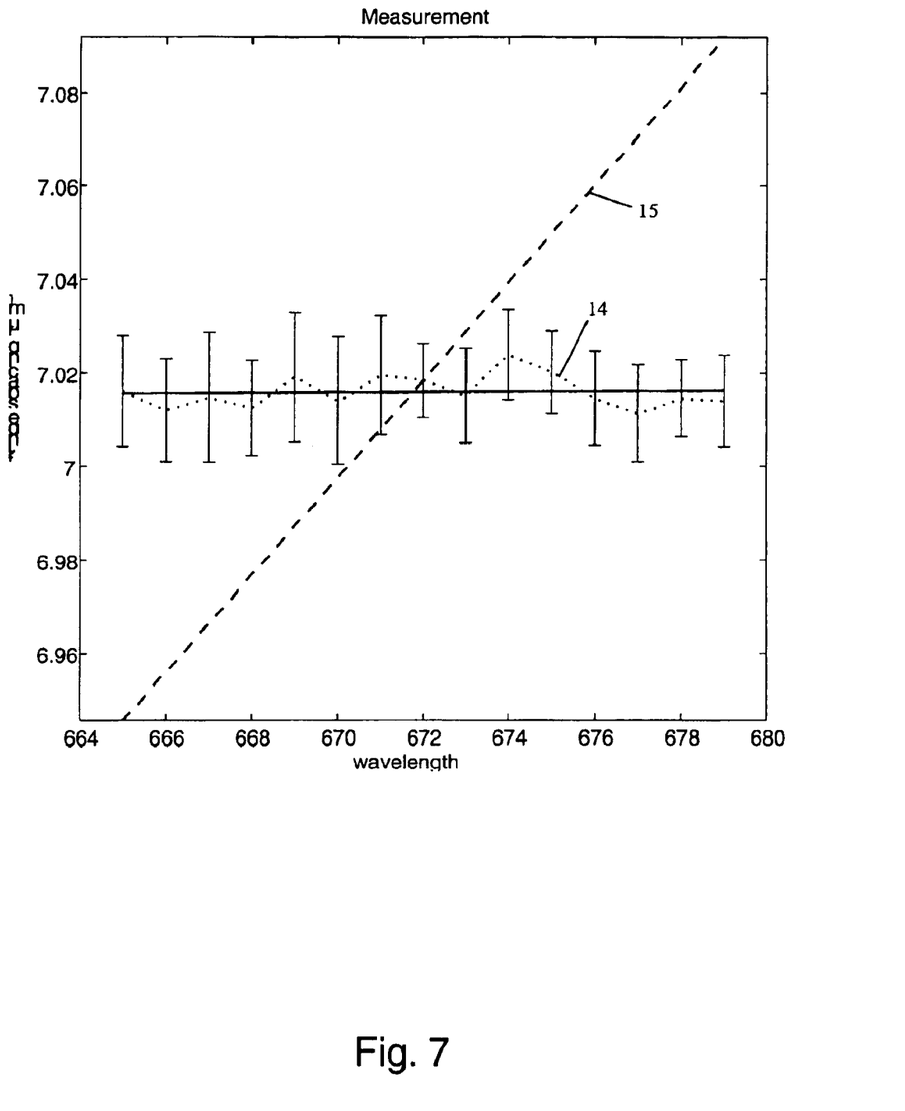
FIG. 7 shows results of measurements. The error bars show the standard deviations of the measurements for each wavelength. The dotted line is a linear best fit to the measurements, while the dashed line shows the theoretical fringe spacing of an uncompensated system.

The measurements were Fourier transformed to find the fringe spacing. The results of the measurements are shown in FIG. 7. The error bars show mean measured fringe spacing together with the standard deviation of the measurements. The standard deviation of the measurements is 1.5–2 per mill of the mean fringe spacing.

The dotted line 14 shows a linear fit to the measured fringe spacing, while the dashed line 15 shows the theoretical fringe spacing for an uncompensated system. The measurements clearly show that the diffractive beam splitter compensates for wavelength fluctuations.

Figure 8:
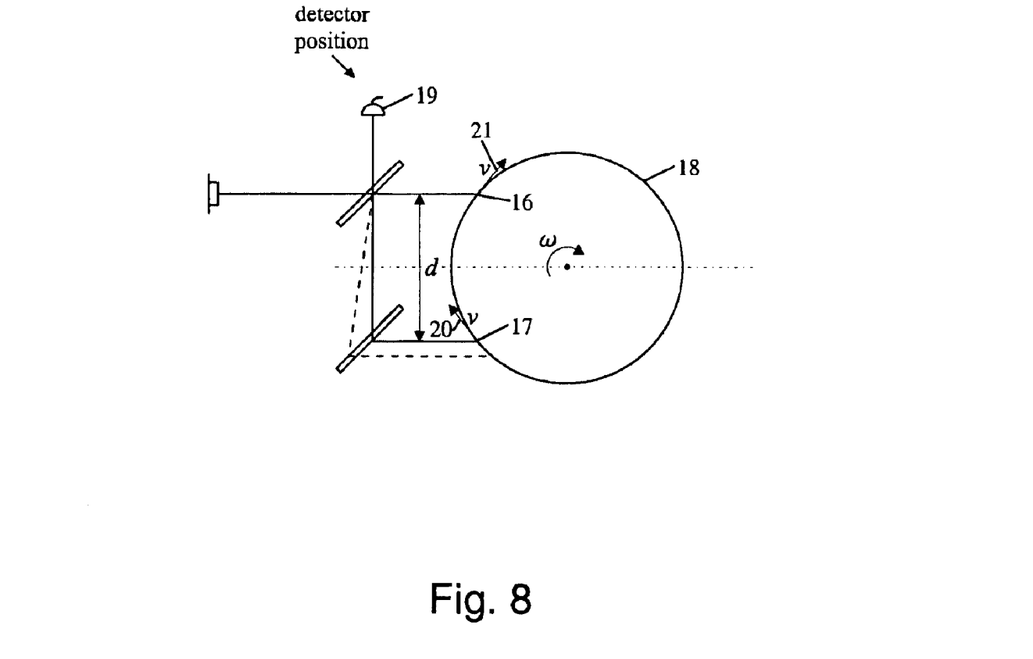
FIG. 8 shows a system for measuring rotational speed of an object.

A system for measuring rotational speed is shown in FIG. 8. The idea is here to probe two points 16,17 on the surface of an object 18 of which one wants to measure the rotational speed. The reflected light from the two points is mixed and observed with a detector 19. Due to the rotation of the object and consequently movement of the surface at the two probing points, the light from both of the reflected beams will experience a shift in frequency when observed—a so-called Doppler shift. The frequency shift from the two points will be slightly different due to the different velocity vectors 20,21 at the probing points. The detector will measure a signal where the beat of this signal will have a frequency, f, equal to the difference between the two Doppler shifts. The measured frequency will be independent of the radius of the object—that is it will measure the correct rotational speed no matter the size of the object.

The Doppler shift is proportional to the frequency of the source (the laser) and consequently the measured signal will also be proportional to the frequency and hence inverse proportional to the operating wavelength. However, the measured frequency will also be proportional to the beam spacing, d, $$f = \frac{2}{\lambda}\omega d$$

By applying the diffractive optical beam splitter in the system, one can thus obtain a system, which not only is independent of the radius of the object but also independent of wavelength fluctuations of the light source, since the beam splitter can be designed such that the beam spacing is proportional to the wavelength.

Figure 9:
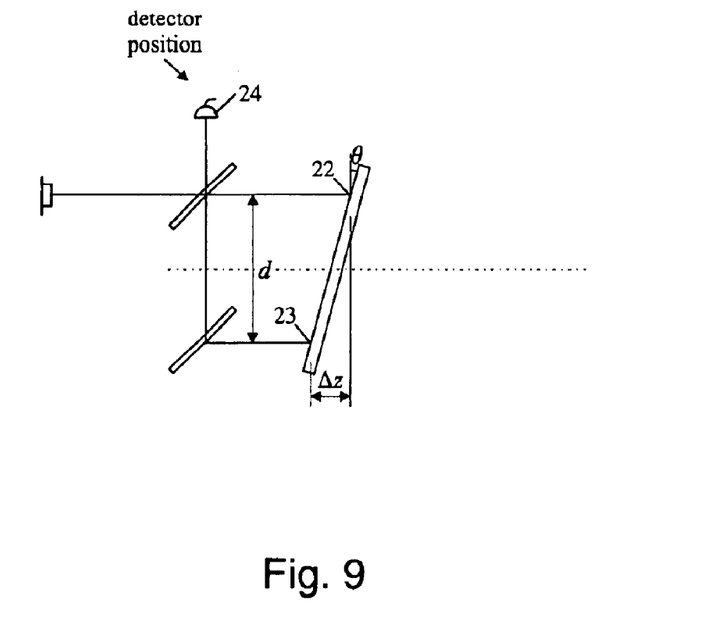
FIG. 9 shows a system for measuring tilt.

A system for measuring tilt or angular deflections of an object is similar to the system for measuring rotational speed. Once again, the idea is to probe two points 22,23 on the object surface of which one wants to measure the angular deflection as illustrated in FIG. 9.

The two reflected beams is mixed and is observed with a detector 24. The phase of the measured interference signal will be proportional to the difference between the optical path lengths of the two beams. The path difference, $\Delta z$, is inversely proportional to the wavelength and proportional to the beam spacing, $$\Delta z = \frac{d \tan\theta}{\lambda} \approx \frac{d\theta}{\lambda}$$

where the last approximation is valid for small angular deflections. It is seen that by applying the diffractive optical beam splitter, one can obtain a system where the tilt measurement is independent of wavelength fluctuations, since the beam splitter can be designed such that the beam spacing is proportional to the wavelength.

In general it should be mentioned that the present invention may be applied in a variety of applications. Thus, variations and modifications of the disclosed embodiments may be implemented by a skilled person in the art without departing from the spirit and scope of the present invention.

What is claimed is:

1. An apparatus for use in the determination of a condition or state of an object based on quasi-elastic interaction between the object and light transmitted to the object, comprising:

a beam splitter arrangement for splitting an incoming light beam of wavelength, $\lambda$, into a diffracted light beam and an undiffracted light beam, the beam splitter arrangement comprising a first and a second diffractive member, the first diffractive member transforming the light beam emitted by the light source into the diffracted and the undiffracted light beams, the second diffractive member receiving the diffracted light beam and diffracting the received light beam in a direction substantially parallel to the undiffracted light beam from the first diffractive member, wherein the diffracted light beam, after being diffracted by the second diffractive member, and the undiffracted light beam from the first diffractive member are separated by a distance, d, said distance, d, being dependent on wavelength, $\lambda$.

2. An apparatus according to claim 1, wherein distance, d, is substantially linear dependent on wavelength, $\lambda$.

3. An apparatus according to claim 1, wherein the first and second diffractive members are diffraction gratings.

4. An apparatus according to claim 3, wherein the diffraction gratings have substantially identical grating constants.

5. An apparatus according to claim 4, wherein the diffraction gratings are surface relief gratings.

6. An apparatus according to claim 4, wherein the diffraction gratings in combination diffract the incoming light beam in such a way that approximately 50% of the intensity of the incoming light beam is contained in the undiffracted light beam from the first diffractive member, and that approximately 50% of the intensity of the incoming light beam is contained in the light beam diffracted from the second diffractive member.

7. An apparatus according to claim 1, further comprising a set of reflective members, said set of reflective members being inserted in the undiffracted beam of the first diffractive member and producing a redirected beam substantially parallel to the diffracted beam of the second diffractive member and thereby altering the distance d.

8. An apparatus according to claim 7, wherein the set of reflective members is formed by two reflective members, such as two reflective mirrors.

9. An apparatus according to claim 7, wherein the set of reflective members is formed by two diffractive reflective members, such as two reflective linear gratings.

10. An apparatus according to claim 1, further comprising a set of diffractive transmission members, said set of diffractive transmission members being inserted in the undiffracted beam of the first diffractive member and producing a redirected beam substantially parallel to the diffracted beam of the second diffractive member and thereby altering the distance d.

11. An apparatus according to claim 10, wherein the set of diffractive transmission members is formed by two transmission gratings having substantially identical grating constants, such as transmission surface relief gratings.

12. An apparatus according to claim 1, further comprising a detector, the detector being adapted to, via first and second diffractive members, detect light that has interacted with the object, the detection being performed in such a way that light from at least two measurement points on a surface of the object interfere on the detector, whereby the rotational speed of the object may be determined.

13. An apparatus according to claim 1, further comprising a detector, the detector being adapted to, via first and second diffractive members, detect light that has interacted with the object, the detection being performed in such a way that light from at least two measurement points on a surface of the object interfere on the detector, whereby a tilting of the object may be determined.

14. An apparatus according to claim 1, further comprising a refractive member inserted in the propagation paths of the diffracted and undiffracted light beams, said refractive member being adapted to change the propagation directions of the diffracted and undiffracted light beams so that the beams, in an intersection region, form a measurement volume having a fringe spacing being substantially independent of wavelength, $\lambda$, the measurement volume being substantially fixed in space.

15. An apparatus according to claim 14, wherein the refractive member is a focusing lens, the intersection region falling within the beam-waist of the two beams.

16. An apparatus according to claim 1, further comprising a receiver for receiving light that has interacted with the object.

17. An apparatus according to claim 14, further comprising a receiver for receiving light that has interacted with the object wherein the refractive member forms part of the receiver.

18. An apparatus according to claim 16, further comprising a processor operatively connected to the receiver for determining the condition or state of the object based on the detected light.

19. An apparatus according to claim 1, further comprising a light source for emission of the incoming light beam.

20. An apparatus according to claim 19, further comprising means for collimating the emitted light beam.

21. An apparatus according to claim 19, wherein the light source emits light between 400 and 10600 nm.

22. An apparatus according to claim 19, wherein the light source is a substantially monochromatic light source.

23. An apparatus according to claim 22, wherein the light source is a laser.

24. An apparatus according to claim 22, wherein the light source is a laser diode.

25. A flow sensor for measuring flow velocity of a fluid, the flow sensor comprising an apparatus according to claim 1.

26. A flow sensor according to claim 25, wherein the fluid is a gas.

27. A flow sensor according to claim 25, wherein the fluid is a liquid.

28. A velocity sensor for measuring a surface velocity of an object, the velocity sensor comprising an apparatus according to claim 1.

29. A method for the determination of a condition or state of an object based on quasi-elastic interaction between the object and light transmitted to the object, the method comprising the steps of:

providing a beam splitter arrangement for splitting an incoming light beam of wavelength, $\lambda$, into a diffracted light beam and an undiffracted light beam, the beam splitter arrangement comprising a first and a second diffractive member, the first diffractive member transforming the light beam emitted by the light source into the diffracted and the undiffracted light beams, the second diffractive member receiving the diffracted light beam and diffracting the received light beam in a direction substantially parallel to the undiffracted light beam from the first diffractive member, wherein the diffracted light beam, after being diffracted by the second diffractive member, and the undiffracted light beam from the first diffractive member are separated by a distance, d, said distance, d, being dependent on wavelength, $\lambda$.

* * * * *